(12) United States Patent
Sudau

(10) Patent No.: US 7,011,196 B2
(45) Date of Patent: Mar. 14, 2006

(54) BRIDGING CLUTCH FOR A HYDRODYNAMIC TORQUE CONVERTER

(75) Inventor: Jörg Sudau, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/790,918

(22) Filed: Mar. 2, 2004

(65) Prior Publication Data

US 2004/0178037 A1    Sep. 16, 2004

(30) Foreign Application Priority Data

Mar. 11, 2003 (DE) ................................ 103 10 423

(51) Int. Cl.
*F16H 45/02* (2006.01)
(52) U.S. Cl. ................. 192/3.29; 192/113.36
(58) Field of Classification Search ............. 192/3.29, 192/70.12, 70.14, 107 R, 113.31, 113.36
See application file for complete search history.

(56) References Cited

U.S. PATENT DOCUMENTS

| | | |
|---|---|---|
| 4,523,816 A | 6/1985 | Kreitzer |
| 5,575,363 A | 11/1996 | Dehrmann et al. |
| 5,669,474 A * | 9/1997 | Dehrmann et al. ........ 192/3.29 |
| 5,799,763 A * | 9/1998 | Dehrmann .................. 192/3.29 |
| 5,921,366 A * | 7/1999 | Walth et al. ........... 192/113.36 |
| 6,742,637 B1 * | 6/2004 | Ackermann ................ 192/3.29 |
| 2003/0010589 A1 | 1/2003 | Granderath |

* cited by examiner

*Primary Examiner*—Saul Rodriguez
(74) *Attorney, Agent, or Firm*—Cohen, Pontani, Lieberman & Pavane

(57) ABSTRACT

A bridging clutch for a hydrodynamic torque converter which is designed with at least one friction area on a first converter component, which area can be shifted into working connection with at least one opposing friction area provided on a second converter component by means of an engaging movement or which can be separated from this second component by a disengaging movement in the direction opposite to the engaging movement. At least one of the two converter components acts as a friction lining carrier, which carries a friction lining in the friction area or in the opposing friction area, at least one opening being provided in the friction lining to allow the passage of transport medium, the inflow area of the opening being on the same radial side of the friction lining as its outflow area. On at least one of the converter components serving as a friction lining carrier, at least one friction lining is provided with an opening, which, on the radial side with the inflow area and the outflow area, is open continuously over its entire extent in the circumferential direction of the friction lining.

14 Claims, 5 Drawing Sheets

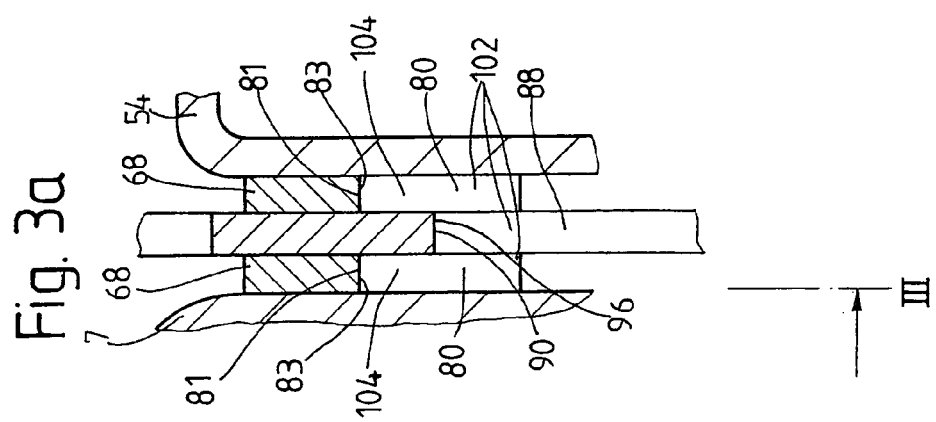
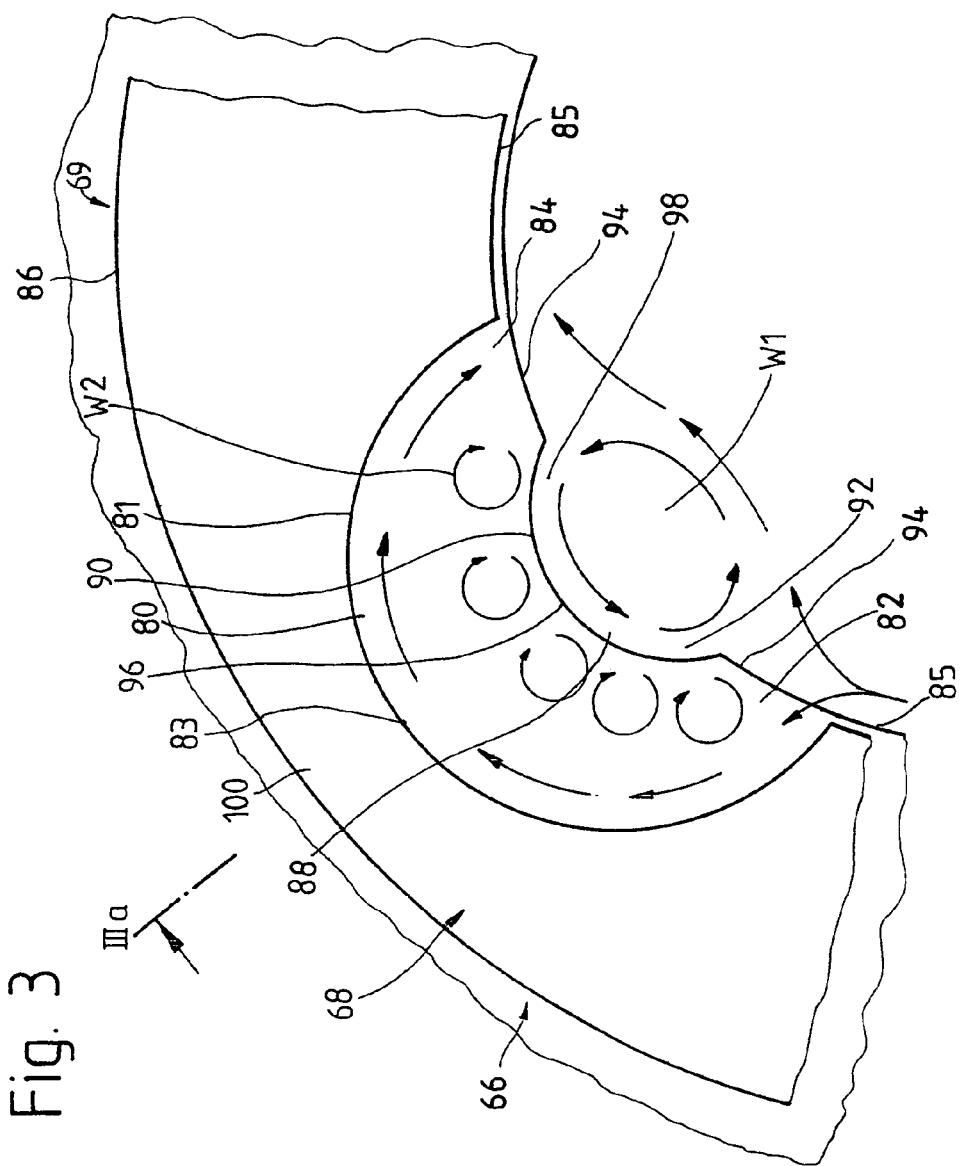

BRIDGING CLUTCH FOR A HYDRODYNAMIC TORQUE CONVERTER

BACKGROUND OF THE INVENTION

1. Field of the Invention

The invention pertains to a bridging clutch including a first converter component having a friction area and a friction lining carrier carrying a friction lining, wherein the friction lining and the friction area can be shifted into working connection by an engaging movement, the friction lining having radially inner side with at least one radially inward facing opening with an inflow area and an outflow area for the passage of transport medium.

2. Description of the Related Art

A bridging clutch for a hydrodynamic torque converter is known from U.S. 2003/010589. This bridging clutch has a piston, and as shown in FIG. 1, the side of this piston which faces the converter cover can be brought into working connection with a first friction lining, one side of which is attached to a plate connected nonrotatably to the turbine wheel of the torque converter. The plate carries on its opposite side, i.e., the side facing a converter cover, a second friction lining, which, like the first friction lining, serves as a friction area. The piston can be moved either toward the converter cover to engage the bridging clutch or in the opposite direction to disengage the clutch. As soon as the friction area of the first friction lining makes contact with the piston and the second friction lining makes contact with the converter cover, the contact surfaces of the piston and the converter cover serve as opposing friction areas. The piston acts as the first converter component, the converter cover as the second converter component, and the plate as the third converter component of the bridging clutch.

As soon as the bridging clutch is at least essentially engaged, a rotational movement of the converter housing around its axis of rotation is no longer transmitted via a hydrodynamic circuit within the pump wheel, the turbine wheel, and the stator to a transmission input shaft, but rather arrives directly at the shaft just mentioned via the bridging clutch.

The use of the bridging clutch may be advantageous from the standpoint of energy efficiency, but when it is in operation, the bridging clutch should also be used to damp any torsional vibrations that may be introduced along with the introduced torque. For this reason, the piston of a bridging clutch designed without a torsional vibration damper is relieved of some of the load being exerted on it by decreasing the pressing force directed toward the converter cover. This allows the clutch intentionally to slip, and although this may indeed serve to damp the introduced torsional vibrations effectively, it also allows a considerable amount of heat to build up in the friction area and in the opposing friction area. Measures must therefore be taken to ensure that the heat which thus develops can be removed as quickly as possible from the working area of the bridging clutch. In U.S. 2003/010589, this is accomplished by providing openings in the friction linings. As shown in FIG. 2, these openings are preferably designed in such a way that their outer radial contour extends essentially radially inward in opposite directions from a crest point and terminates in the radially inward direction at inflow and outflow areas. The inner radial contour of the openings, which are formed as grooves, copies the geometry of the outer radial contour. A groove-like opening formed in this way in a friction lining is referred to by experts in the field as an "arc groove".

An investigation of these types of openings in the friction linings of bridging clutches led to the following conclusions:

As a result of the relative rotational movement between the converter component with the friction surface and the converter component with the opposing friction surface, transport medium flows into the associated inflow area of each opening and then continues toward the outflow area. Nevertheless, some of the transport medium will adhere both to the outer radial contour of the opening and to the inner radial contour, so that boundary layers with pronounced velocity gradients will form near the contours. Because of the difference between the velocity of the boundary layer at the outer radial contour and the velocity of the boundary layer at the inner radial contour, a vortex will form essentially in the outflow area of the opening, as studies have shown and as FIG. 5 of the present patent application illustrates on the basis of the state of the art. It is true that basically cool transport medium is concentrated in the area over which this vortex extends, and this should promote a very effective heat exchange. This vortex, however, at least narrows down the outflow area of the opening or possibly even blocks it completely. The result is that heated transport medium present in the opening cannot leave the opening via the outflow area at a fast enough rate, and accordingly it is impossible for cool transport medium to enter at the inflow area of the opening. Instead, most of this transport medium will pass by the opening on the radially inner side and, after flowing around the vortex mentioned, will proceed in the circumferential direction to the adjacent opening. It is obvious that the cooling effect therefore not only becomes highly irregular, but is also reduced to a minimum.

SUMMARY OF THE INVENTION

The invention is based on the task of designing the friction area of the bridging clutch of a hydrodynamic torque converter in such a way that a highly effective and uniform cooling effect with a high degree of energy efficiency is guaranteed in the friction area.

According to the invention, an opening is provided in a friction lining on at least one of the converter components serving as a friction lining carrier, this opening being open continuously along its entire circumferential extent on the radial side of the friction lining with the inflow and outflow areas. As a result, in a boundary layer, some of the transport medium which has entered via the inflow area of the opening adheres to the outer radial contour of the opening. Thus a velocity gradient develops. Starting from this boundary layer, the flow velocity increases in the direction radially toward the inside, which promotes the formation of a vortex. Because the opening is open continuously along its entire circumferential extent, it is possible for this vortex to spread out over a comparatively large area of the opening; under especially favorable flow conditions, the vortex can even fill up the opening completely. Because cool transport medium is always being drawn in by a vortex of this type and because turbulence is known to promote superior heat exchange, the inventive design of the opening guarantees that a large amount of heat is absorbed from the friction area. This heat is then transported radially inward by the vortex and transferred to a cool flow of transport medium which is passing by on the radially inner side of the vortex and thus of the opening. It has been found that the friction lining carrier can be designed in various advantageous ways to conform to the inventive opening in the friction lining, as will be presented in detail below.

In a first design, the friction lining carrier is provided with a recess, which is located in the area over which the opening in the friction lining extends and which, with respect to its geometry and its dimensions, essentially conforms to the opening in the friction lining. In this way, the thickness of the friction lining in the axial direction is added to the thickness of the friction lining carrier, so that a much deeper space is available for the formation of a vortex than would be the case if there were only a friction lining. Because the axis of rotation of the vortex extends essentially in the said axial direction of the friction lining carrier and the friction lining, it is possible in this way to obtain a vortex zone which is comparatively large in the axial direction and which contains a highly energetic vortex, as a result of which an intensive and simultaneously uniform heat exchange can be achieved. Of course, the effective height available to the vortex would be increased even more and thus the heat exchange made even more effective by the use of a plate with a friction lining carrier which has a friction lining on each side, the openings in the two friction linings being aligned not only with each other but also with the corresponding recess in the friction lining carrier.

According to another design, the friction lining carrier again has a recess located in the area over which the opening in one or both friction linings extends, but the dimensions of the recess in the friction lining carrier in this case are smaller than those of the openings in the friction linings. It is true that the resulting vortex, which is referred to below as the "main vortex", will be smaller around the axis of rotation of the vortex than that which is formed in the previously described design, which means that the possibility for heat exchange is also reduced, but smaller "secondary vortices" will also form, especially on the side of the main vortex facing the associated outer contour of the opening. The axes of rotation of these secondary vortices will be essentially parallel to that of the main vortex, but they can be only as long as the depth of the associated friction lining in the axial direction. The secondary vortices can come into contact with large areas of the friction lining carrier, which, in contrast to the friction linings, is usually made of a material with good thermal conductivity, such as metal, and which therefore releases the heat it has absorbed from the friction linings very effectively to the adjacent secondary vortices.

In a third design, the friction lining carrier is designed to be essentially free of interruptions in the area over which the opening in a friction lining extends, so that the previously explained main vortex has only a limited opportunity to form. Thus the secondary vortices become even more important.

It is preferable for the openings in the friction linings according to the invention to be realized with a geometry which, with respect to the outside contour, starts from a crest point. The outer radial contour then proceeds in opposite directions essentially radially toward the inside, leading to the inflow and outflow areas. An opening with this type of geometry is adapted optimally to the shape of the vortex which forms within it, which is highly advantageous for the sake of efficient heat transfer. For the same reasons, the recess possibly provided in the friction lining carrier will preferably also have the same geometry as that of the openings in the friction linings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1A shows an enlarged view of the detail marked X in FIG. 1;

FIG. 3 is the same as FIG. 2, except that the recess in the friction lining carrier is smaller than the opening in the friction lining;

FIG. 3A shows a cross-sectional view across the plate along line IIIa—IIIa of FIG. 3;

DETAILED DESCRIPTION OF THE PRESENTLY PREFERRED EMBODIMENTS

Figure 1:
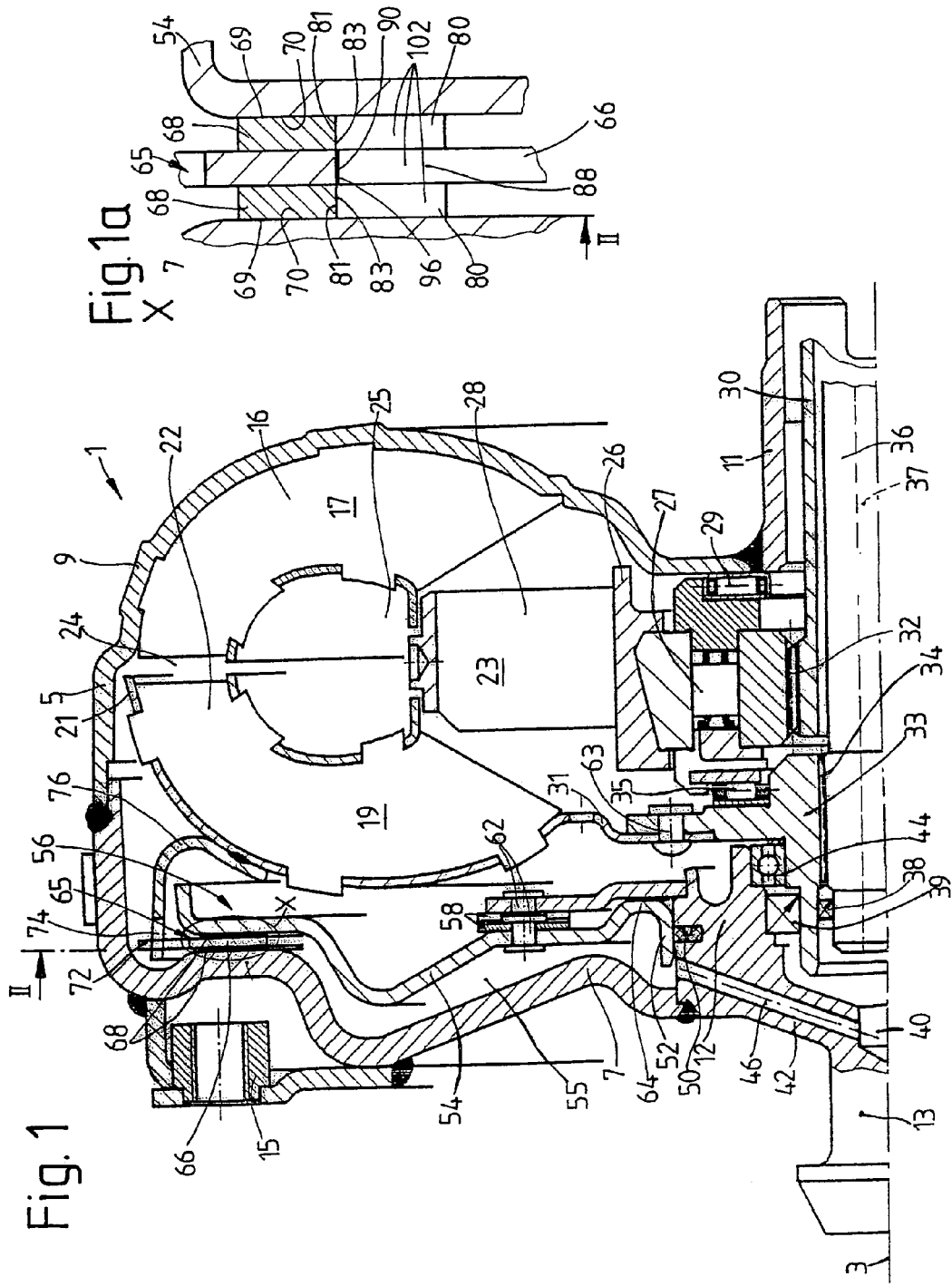
FIG. 1 shows the upper half of a longitudinal cross section through a hydrodynamic torque converter with a bridging clutch, which, as shown at the detail marked X, has a plate with a friction lining carrier, to each side of which a friction lining is attached, this plate being located axially between a converter cover and the piston of the bridging clutch.

FIG. 1 shows a hydrodynamic torque converter 1, which is able to rotate around an axis of rotation 3. The hydrodynamic torque converter 1 has a converter housing 5, which has a converter cover 7 on the side facing a drive unit (not shown), such as an internal combustion engine. This cover is permanently connected to a pump wheel shell 9. In the radially inner area, this shell merges into a pump wheel hub 11.

To return to the converter cover 7, its radially inner area is provided with a journal hub 12 carrying a bearing journal 13. The bearing journal 13 is mounted on an element of the drive unit, such as a crankshaft, to center the converter housing 5 on the drive unit side. The method used to mount the journal is known in and of itself and is therefore not described in any further detail. The converter cover 7 also has a mounting receptacle 15, which usually serves to attach the converter housing 5 to the drive unit preferably by means of a flexplate (not shown). See, for example, FIG. 1 of U.S. Pat. No. 4,523,916 for a diagram of how the bearing journal of a torque converter is mounted in a crankshaft of a drive unit and of how the torque converter is connected by way of a flexplate to the crankshaft.

The previously mentioned pump wheel shell 9 works together with the pump wheel blades 16 to form a pump wheel 17, which cooperates with a turbine wheel 19 consisting of a turbine wheel shell 21 and turbine wheel blades 22 and also cooperates with a stator 23. The pump wheel 17, the turbine wheel 19, and the stator 23 form a hydrodynamic circuit 24 of the known type, which encloses an internal torus 25.

It should also be mentioned that the stator blades 28 of the stator 23 are provided on a stator hub 26, which is mounted on a freewheel device 27. The latter is supported axially on the pump wheel hub 11 by an axial bearing 29 and is mounted on a support shaft 30, which is located radially inside the pump wheel hub 11, by means of a set of teeth 32, so that it cannot rotate but can shift axially relative to the shaft. The support shaft 30, which is hollow, encloses a transmission input shaft 36, which is provided with a central bore 37 for the passage of hydraulic fluid. The transmission input shaft 36 supports a turbine hub 33 by way of a set of teeth 34 so that the hub cannot rotate relative to the shaft but can shift axially. This turbine hub 33 has a radially outer area, to which a turbine wheel base 31 is attached by means of a riveted joint 63. On one side the turbine hub 33 is supported on the previously mentioned freewheel device 27 by an axial bearing 35, and on the other side it rests by way of an axial bearing 44 against the journal hub 12. Radially toward the inside, the turbine hub 33 is sealed off by a seal 38 against the transmission input shaft 36, and radially toward the outside by a seal 39 against the bearing journal 12.

The previously mentioned central bore 37 in the transmission input shaft 36 serves to supply the hydrodynamic circuit 24 and to exert pressure on a bridging clutch 56, to be described below, for which purpose connections to a control device and to a reservoir of hydraulic fluid are required. Neither the control device nor the hydraulic fluid reservoir is shown in the drawing, but they can be seen in FIG. 1 of U.S. Pat. No. 5,575,363 and are therefore to be considered included in the content of the present patent application.

Hydraulic fluid which has entered via the central bore 37 in the transmission input shaft 36 arrives in a transition space 40; from there, it travels radially outward via channels 46 in the journal hub 12 serving as a flow passage 42 to a chamber 55, located axially between the converter cover 7 and the piston 54 of the previously mentioned bridging clutch 56. This piston 54 is centered with respect to the converter cover 7, and the side which faces away from the chamber 55 faces the hydrodynamic circuit 24. This piston can move between two different limit positions, which will be discussed in greater detail below, as a function of the pressure relationships in the hydrodynamic circuit 24 and in the chamber 55. The piston 54 has a base 52, which is supported on the journal hub 12 and which allows the piston to shift axially. A piston seal 50 set into the journal hub 12 performs a sealing function with respect to the piston base 52. In the radially inner area of the piston 54, the piston is attached by means of a riveted connection 62 to a mounting device 60 by way of tangential leaf springs 58, the mounting device itself being attached to the journal hub 12.

A plate 65 is mounted axially between the converter cover 7 and the radially outer area of the piston 54. This plate has a friction lining carrier 66, each side of which carries a friction lining 68. Each of these friction linings 68 represents a friction area. The friction lining carrier 66 is provided with a set of teeth 72 on its outer periphery, i.e., on its outer circumference, which meshes with an opposing set of teeth 74 on an anti-rotation device 76. The latter is attached in turn to the turbine shell 21. The friction lining carrier 66 and the plate 65 are thus connected nonrotatably but with freedom of relative axial movement to the turbine hub 33 by the anti-rotation device 76.

On the side facing the converter cover 7, the radially outer area of the piston 54 forms an opposing friction area 70, which extends like a ring around the axis of rotation 3 and faces the friction area 69 of the adjacent friction lining 68. The side of the converter cover 7 facing the adjacent friction lining 68 also forms an opposing friction area 70. The individual friction areas 69 and the individual opposing friction areas 70 can be brought into friction-locking connection with each other when the pressure in the hydrodynamic circuit 24 acting on the opposite side of the piston 54 is greater than that in the chamber 55. The friction areas 69 and the opposing friction areas 70 are shown in detail in the detailed view of "X" in FIG. 1A.

In a manner known in itself, the piston 54 is able to move axially between two possible limit positions, a first limit position being reached when the friction linings 68 with their friction areas 69 come to rest in a friction-locking manner against the associated opposing friction areas 70. The second limit position, however, is reached when the pressure in the chamber 55 is greater than that in the hydrodynamic circuit 24, and the piston 54 is therefore shifted axially against the action of the tangential leaf springs 58, which want to push the piston 54 toward the converter cover 7, until it comes to rest against a stop 64 on the mounting device 60.

Figure 2:
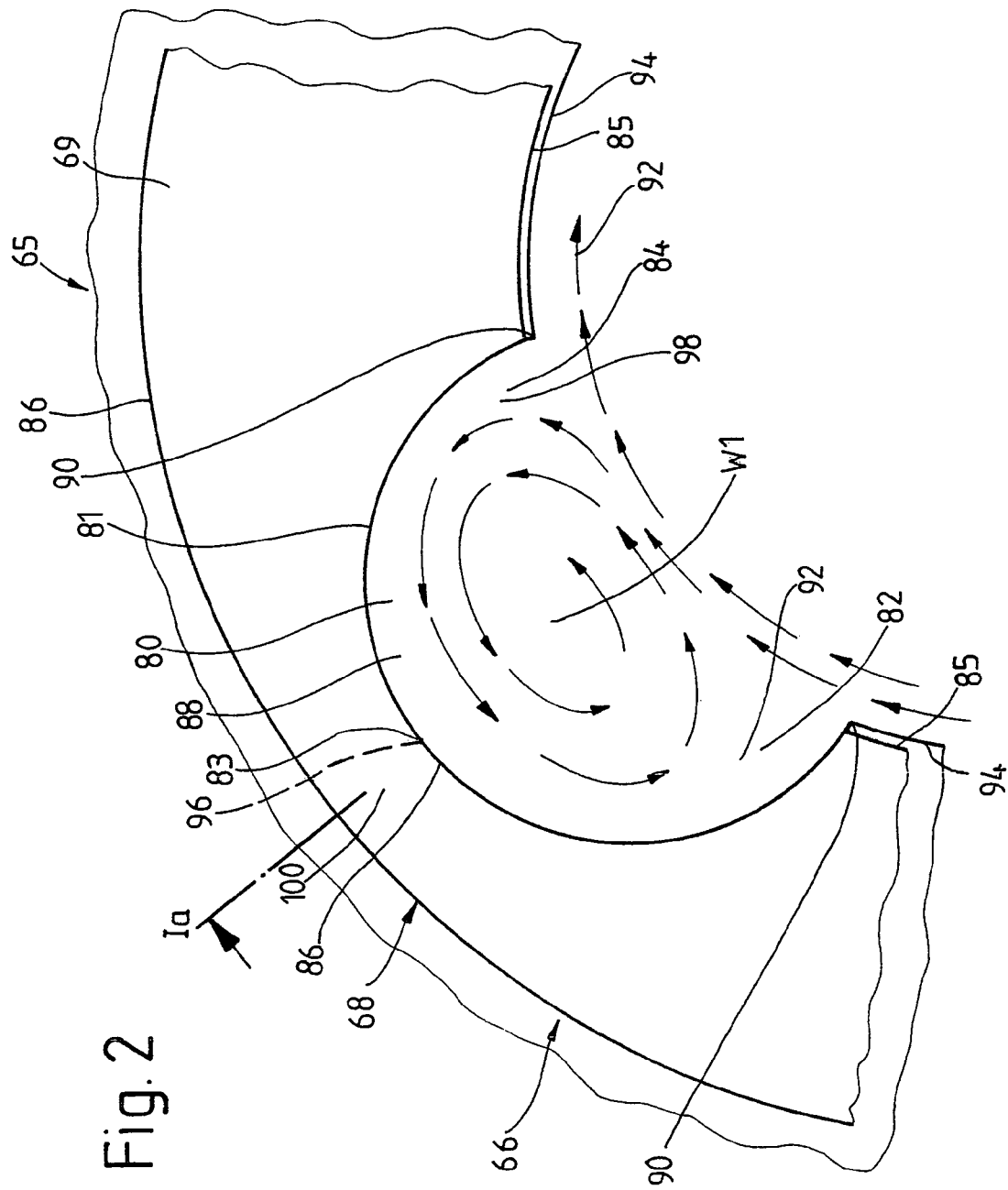
FIG. 2 shows a plan view of a segment of the friction lining along the cross-sectional line II—II of FIG. 1 with a diagram of the flow conditions of the transport medium in an opening in the friction lining and in an essentially equally sized recess in the friction lining carrier of the plate.

A cross-sectional line II—II is shown in detail in FIG. 1A. Looking in the direction according to this cross-sectional line, it is possible to see the friction lining 68 facing the converter cover 7 and the friction lining carrier 66 of the plate can be seen. FIG. 2 shows an enlarged, partial view of a segment of this friction lining 68 and of the friction lining carrier 66. This segment of the friction lining 68 reveals an opening 80, which, with respect to its outer contour 81, extends essentially along an arc through the friction lining 68, proceeding first radially outward from an inflow area 82 on the inner radial side 85 of the friction lining 68 to a crest point 83, from which it then proceeds back again radially inward to an outflow area 84, which, like the inflow area 82, is on the inner radial side 85 of the friction lining 68. When an opening 80 of this type is provided, a friction ring 100 free of breaks remains in the radially outer area of the friction lining 68, that is, radially between the crest point 83 and an outer radial side 86; to the extent that the friction lining 68 is in contact with the converter cover 7, this friction ring exerts a limited sealing effect.

Both FIG. 1A and FIG. 2 show the friction lining carrier 66 of the plate 65 in addition to the previously explained friction lining 68; this carrier has a recess 88, which, like the opening 80 in the friction lining 68, extends with respect to its outer contour 104 essentially in the form of an arc in the friction lining carrier 66, namely, proceeding radially outward from an inflow area 82 on the inner radial side 94 of the friction lining carrier 66 to crest point 96, then proceeding back radially inward again to an outflow area 84, which, like the inflow area 82, is on the inner radial side 94 of the friction lining carrier 66. The recess 88 in the friction lining carrier 66 conforms essentially to the opening 80 in the friction lining 68 with respect to its geometry and also with respect to its dimensions and is therefore coincident with it.

Figure 4:
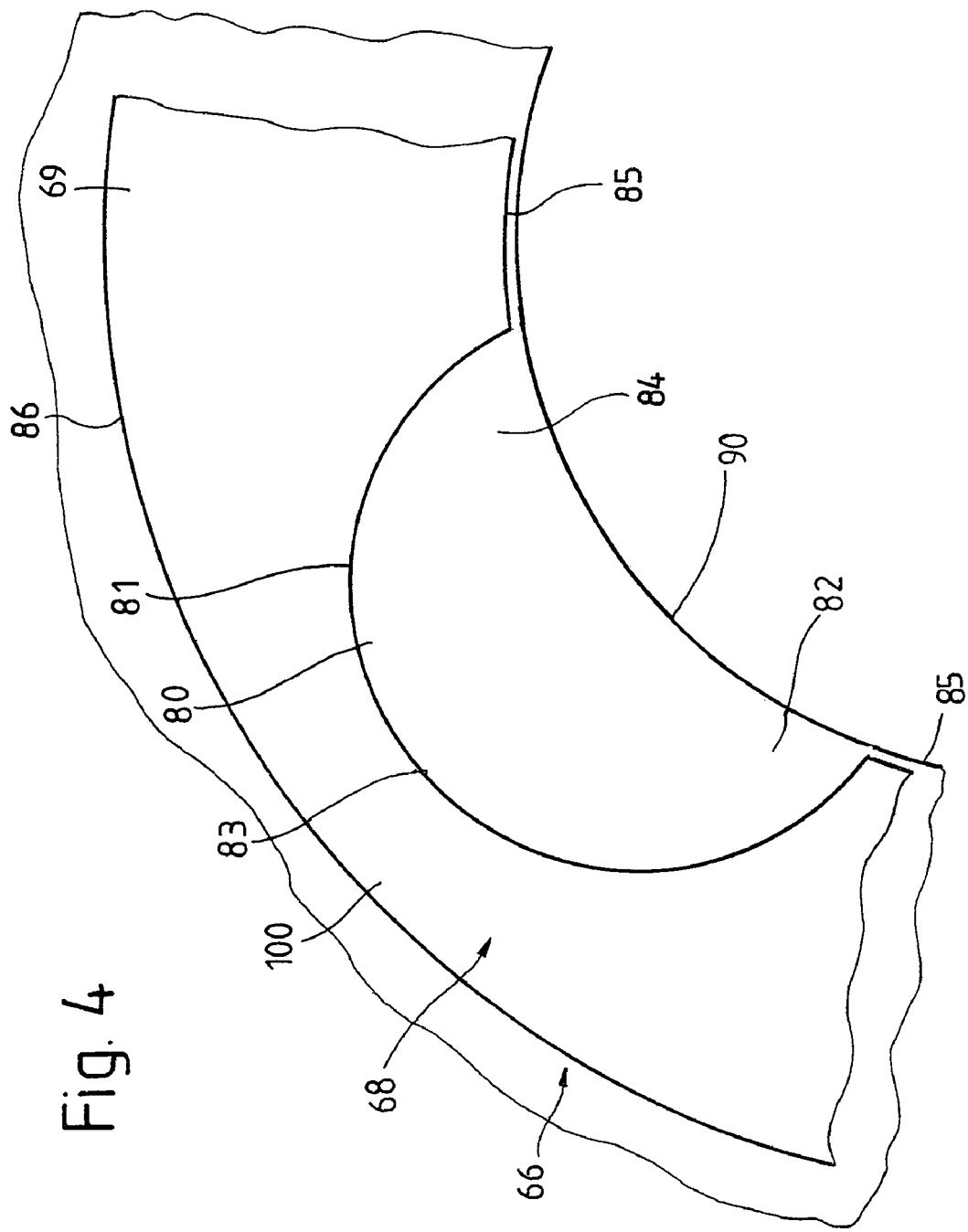
FIG. 4 is the same as FIGS. 2 and 3, except that the friction lining carrier does not have a recess.
Figure 5:
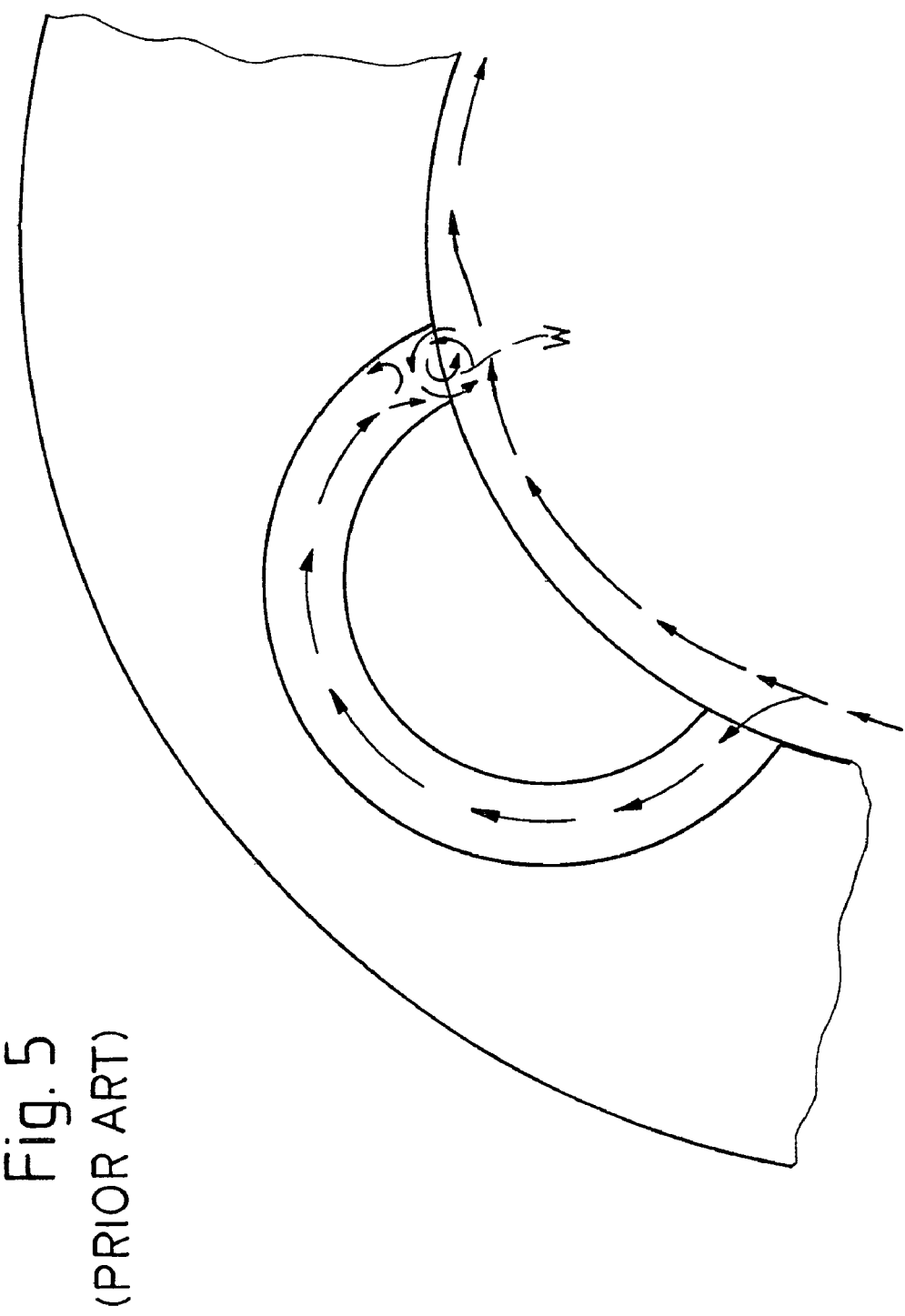
FIG. 5 shows a diagram of the flow conditions of the transport medium in an opening according to the state of the art.

The formation of the various friction linings 68 and of the friction lining carrier 66 is now to be considered in greater detail. The following description begins with the side on the left in FIG. 2 under the assumption that the friction lining 68 and thus the friction lining carrier 66 holding it execute rotational movement in the direction in which the opening 80 of the friction lining 68 has its inflow area 82 on the left and its outflow area 84 on the right. Accordingly, with respect to FIG. 2, the friction lining 68 is assumed to move in the counterclockwise direction. The rotational direction is the same in FIGS. 3, 4, and 5; FIGS. 3 and 4 show additional embodiments of the invention, whereas FIG. 5 shows the flow relationships according to the state of the art, as they occur in, for example, the openings according to the previously mentioned U.S. 2003/010589.

FIG. 2 pertains to an embodiment in which a recess 88 is provided in the friction lining carrier 66. With respect to its geometry and its dimensions, this recess conforms essentially to the opening 80 in the friction lining 68. For this reason, the recess 88 in the friction lining carrier 66 in FIG. 2 can be seen only at the point at which the outer contour 90 of the recess 88 reaches the associated adjacent inner radial side 94, which can extend slightly farther radially inward than the inner radial side 85 of the friction lining 68. Because the rest of the area of the outer contour 90 according to FIG. 2 is concealed by the friction lining 68, the crest point 96 of the recess 88 is only indicated by a broken reference line. Like the outer contour, the inflow area 92 of the recess 88 also agrees with the inflow area 82 of the opening 80, and the outflow area 98 of the recess agrees with the outflow area 84 of the opening 80. For the sake of clarity, reference is made to FIG. 1A, which shows a view along the cross-sectional line designated "Ia" in FIG. 2. It is especially easy to see in FIG. 1A that, as a result of the conformity between the recess 88 and the opening 80, a vortex space 102, which extends in the axial direction between the converter cover 7 and the piston 54, is formed radially inside the crest points 83 of the friction linings 68 and radially inside the crest point 96 of the friction lining carrier 66. This vortex space has the function described below.

Cool transport medium flowing along the inner radial sides 85 and 94 of the friction linings 68 and of the friction lining carrier 66 arrives at the inflow area 82 of the openings 80 and in the inflow area 92 of the recess 88 and then enters the openings 80 and the recess 88, where it attempts to flow along the outer contours 81 of the openings 80 and along the outer contour 90 of the recess 88. Because this cool transport medium adheres to the outer contours 81, 90, a boundary layer forms with a velocity gradient between the flow areas near the outer contour and the flow areas farther away from the outer contour. This velocity gradient has the effect of promoting the formation of a vortex W1, which, if the openings 80 and the recess 88 are of optimal design with respect to their geometry and dimensions, will fill up preferably the entire area of the openings 80 and of the recess 88. In addition, because it can extend axially across both friction linings 68 and the friction lining carrier 66, this vortex can be relatively high in energy. Because of the vigorous mixing in the area of the vortex, i.e., the mixing of the conveyed medium already present in the openings 80 and in the recess 88 with continuously incoming fresh transport medium, a zone containing cool transport medium forms precisely where a cooling function is required, namely, in the area of the friction linings. Thanks to its turbulence, the zone has a high capacity for absorbing heat from the friction linings 68 radially adjacent on one side and from the friction lining carrier 66 radially adjacent on the other. Heat absorbed in this way from the friction area can be passed along promptly to a flow passing along the inner radial side of the vortex W1 and thus transported away from the area over which the openings 80 and the recess 88 extend.

The embodiment according to FIG. 3 deviates from that according to FIG. 2 in that, even though the recess 88 in the friction lining carrier 66 conforms essentially to the openings 80 in the friction linings 68 with respect to its geometric form, its dimensions are much smaller. Thus the vortex space 102, the extent of which can be seen in FIG. 3A, is limited to a comparatively small area, namely, to an area radially inside the outer contour 90 of the recess 88. Thus a vortex W1 forms essentially in the area of the recess 88, although, even with this design, transport medium still adheres to the outer contours 81 of the openings 80 as previously described and thus a velocity gradient forms in the flowing transport medium in the radial area of these outer contours 81. As a result of this velocity gradient and the vortex W1 in the area of the recess 88, smaller vortices W2 form in the radial area in between, which radially surround the large vortex W1. These vortices W2 are smaller than the vortex W1 not only with respect to their circumference but also with respect to their axial dimension, because they can expand only over the cross section of the one individual friction lining 68. As FIG. 3A shows, there is in each case an axially smaller vortex space 104 available on each side for a plurality of these smaller vortices W2, whereas the axially large vortex space 102 is provided for the vortex W1 radially inside the row of small vortices.

In this design as well, the large vortex W1 mixes intensively with the cool transport medium passing along the radially inner side of the vortex W1. The vortex is therefore able to absorb a large amount of heat especially in the area of the outer contour 90 of the recess 88. In addition, however, the large vortex W1 can also absorb heat from the small vortices W2, which for their own part take up heat not only from the outer contour 81 of the associated opening 80 of the friction linings 68, but also to an especially large extent from both axial sides of the friction lining carrier 66, to the extent that this carrier projects into the area over which the openings 80 extend. Because the friction lining carrier 66 is usually made of a metallic material and therefore has good thermal conductivity, it is ensured in this embodiment, in spite of the reduction in vorticity compared to the embodiment of FIG. 2, that the heat in the transport medium will be effectively absorbed and transported away.

The embodiment shown in FIG. 4 differs from that according to FIG. 3 by the complete omission of a recess in the associated area of the carrier 66 over which the openings 80 in the friction linings 68 extend. Of course, in a design such as this, the large vortex W1 will be reduced to a small residuum, and the small vortices W2 will become much more important.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bridging clutch for a hydrodynamic torque converter, said bridging clutch comprising:
   a first converter component having a first friction area; and
   a friction lining carrier carrying a first friction lining, wherein said first friction lining and said first friction area can be shifted into working connection by means of an engaging movement and can be separated by means of a disengaging movement, said first friction lining having a radially inner side provided with at least one radially inward facing first recess, said first recess being continuously open over an entire circumferential length thereof at a continuous circumference of said radially inner side extending between an inflow area and an outflow area for the passage of transport medium.

2. The bridging clutch of claim 1, further comprising a second converter component having a second friction area, said friction lining carrier carrying a second friction lining and being situated axially between said first and second converter components so that second friction lining and said second friction area can be shifted into working connection by means of said engaging movement and can be separated by means of said disengaging movement, said second friction lining having a radially inner side provided with at least one radially inward facing respective recess with an inflow area and an outflow area for the passage of transport medium, each said respective recess being open continuously between said inflow area and said outflow area, said first recess of said first friction lining being axially aligned with said recess of said second friction lining, said carrier having at least one second recess which forms a flow connection between respective said recesses of said first and second friction linings.

3. The bridging clutch of claim 2, wherein each said second recess is located within a circumferential area over which said recesses of said first and second friction linings extend.

4. A bridging clutch as in claim 1 further comprising a second converter component having a second friction area, said friction lining carrier carrying a second friction lining which is axially opposed from said first friction lining, wherein said second friction lining and said first friction area can be shifted into working connection by means of said engaging movement and can be separated by means of said disengaging movement, said second friction lining having a radially inner side provided with at least one radially inward facing second opening with an inflow area and an outflow area for the passage of transport medium, each said second opening being open continuously between said inflow area and said outflow area.

5. A bridging clutch as in claim 4 wherein said friction lining carrier has an annular shape with an inner circumference, each said first opening being axially aligned with a respective said second opening and being shaped and dimensioned as the axially aligned second opening, whereby a flow connection is established between the openings at said inner circumference of said carrier.

6. A bridging clutch as in claim 1 wherein each said opening in the friction lining has a radially outer contour which proceeds radially inward in opposite circumferential directions from a crest point to said inflow area and said outflow area, wherein the friction lining does not have a radial boundary for the opening on the radially inner side of the outer contour of the opening.

7. A bridging clutch as in claim 6 wherein said friction lining carrier has at least one recess aligned with a respective said at least one opening, each said recess having a radially outer contour which proceeds radially inward in opposite circumferential directions, wherein the friction lining carrier does not have a radial boundary for the opening on the radially inner side of the outer contour of the recess.

8. A bridging clutch for a hydrodynamic torque converter, said bridging clutch comprising:

a first converter component having a first friction area; and a friction lining carrier carrying a first friction lining, wherein said first friction lining and said first friction area can be shifted into working connection by means of an engaging movement and can be separated by means of a disengaging movement, said first friction lining having a radially inner side provided with at least one radially inward facing first recess with an inflow area and an outflow area for the passage of transport medium, each said first recess being open continuously between said inflow area and said outflow area, said friction lining carrier having at least one second recess aligned with a respective said at least one first recess, each said second recess essentially conforming to the respective first recess in shape and dimensions.

9. A bridging clutch for a hydrodynamic torque converter, said bridging clutch comprising:

a first converter component having a first friction area; and a friction lining carrier carrying a first friction lining, wherein said first friction lining and said first friction area can be shifted into working connection by means of an engaging movement and can be separated by means of a disengaging movement, said first friction lining having a radially inner side provided with at least one radially inward facing first recess with an inflow area and an outflow area for a passage of transport medium, each said first recess being continuously open over an entire circumferential length thereof at said inner side between said inflow area and said outflow area, said friction lining carrier having at least one second recess aligned with a respective said at least one first recess, each said second recess essentially conforming to said first recess in shape, but having smaller dimensions than said first recess.

10. A bridging clutch for a hydrodynamic torque converter, said bridging clutch comprising:

a first converter component having a first friction area; and a friction lining carrier carrying a first friction lining, wherein said first friction lining and said first friction area can be shifted into working connection by means of an engaging movement and can be separated by means of a disengaging movement, said first friction lining having a radially inner side provided with at least one radially inward facing first recess with an inflow area and an outflow area for the passage of transport medium, each said first recess being continuously open over an entire circumferential length thereof at a continuous inner circumference of the radially inner side between said inflow area and said outflow area, wherein said friction lining carrier is free of interruptions in an area over which each said first recess extends.

11. A bridging clutch for a hydrodynamic torque converter, said bridging clutch comprising:

a first converter component having a first friction area; and a friction lining carrier carrying a first friction lining, wherein said first friction lining and said first friction area can be shifted into working connection by means of an engaging movement and can be separated by means of a disengaging movement, said first friction lining having a radially inner side provided with at least one radially inward facing first recess with an inflow area and an outflow area for the passage of transport medium, each said first recess being open continuously between said inflow area and said outflow area and having a radially outer contour which proceeds radially inward in opposite circumferential directions from a crest point to said inflow area and said outflow area, wherein the first friction lining does not have a radial boundary for said first recess on the radially inner side of the outer contour of the second recess, said friction lining carrier having at least one second recess aligned with a respective said at least one first recess, each said second recess having a radially outer contour which proceeds radially inward in opposite circumferential directions, wherein the friction lining carrier does not have a radial boundary for the first recess on the radially inner side of the outer contour of the second recess, said outer contour of each said second recess being essentially coincident with the radially outer contour of the respective first recess.

12. A bridging clutch for a hydrodynamic torque converter, said bridging clutch comprising:
   a first converter component having a first friction area; and
   a friction lining carrier carrying a first friction lining, wherein said first friction lining and said first friction area can be shifted into working connection by means of an engaging movement and can be separated by means of a disengaging movement,
   said first friction lining having a radially inner side provided with at least one radially inward facing first recess with an inflow area and an outflow area for the passage of transport medium, each said first recess being open continuously between said inflow area and said outflow area,
   each said first recess in the first friction lining has a radially outer contour which proceeds radially inward in opposite circumferential directions from a crest point to said inflow area and said outflow area, wherein the first friction lining does not have a radial boundary for said first recess on the radially inner side of the outer contour of the second recess,
   said friction lining carrier having at least one second recess aligned with a respective said at least one first recess, each said second recess having a radially outer contour which proceeds radially inward in opposite circumferential directions, wherein the friction lining carrier does not have a radial boundary for the first recess on the radially inner side of the outer contour of the second recess,
   wherein said crest point of the radially outer contour of each said first recess in said friction lining is radially outside of the crest point of said respective second recess in the friction lining carrier.

13. A bridging clutch as in claim 12 wherein the opening in each said lining is circumferentially larger than the opening in the respective said recess.

14. A bridging clutch as in claim 12 wherein the radially outer contour of each said opening terminates at its inflow and outflow area at the same radial points as the outer contour of the respective said recess terminates at its inflow and outflow area.

* * * * *